US009553976B2

(12) United States Patent
Kawa

(10) Patent No.: US 9,553,976 B2
(45) Date of Patent: Jan. 24, 2017

(54) MOBILE DEVICE MANAGEMENT DURING SYNCHRONIZED AUDIO PLAYBACK IN COORDINATION WITH EXTERNAL VIDEO PLAYBACK

(71) Applicant: Theater Ears, LLC, Boca Raton, FL (US)

(72) Inventor: Larry A. Kawa, Boca Raton, FL (US)

(73) Assignee: THEATER EARS, LLC, Boca Raton, FL (US)

(*) Notice: Subject to any disclaimer, the term of this patent is extended or adjusted under 35 U.S.C. 154(b) by 33 days.

(21) Appl. No.: 14/601,192

(22) Filed: Jan. 20, 2015

(65) Prior Publication Data
US 2016/0212372 A1 Jul. 21, 2016

(51) Int. Cl.
H04N 9/80 (2006.01)
H04N 5/932 (2006.01)
H04N 5/935 (2006.01)
H04N 5/775 (2006.01)
H04M 1/725 (2006.01)
G06F 3/0484 (2013.01)
G06F 3/0482 (2013.01)
H04N 5/04 (2006.01)
G06F 17/30 (2006.01)
H04N 5/93 (2006.01)
H04N 21/41 (2011.01)
H04N 21/422 (2011.01)
H04N 21/43 (2011.01)
H04N 21/81 (2011.01)

(52) U.S. Cl.
CPC ........ *H04M 1/72577* (2013.01); *G06F 3/0482* (2013.01); *G06F 3/0484* (2013.01); *G06F 17/30746* (2013.01); *H04M 1/72527* (2013.01); *H04M 1/72569* (2013.01); *H04M 1/72572* (2013.01); *H04N 5/04* (2013.01); *H04N 5/775* (2013.01); *H04N 5/7755* (2013.01); *H04N 5/9305* (2013.01); *H04N 21/4126* (2013.01); *H04N 21/42203* (2013.01); *H04N 21/4307* (2013.01); *H04N 21/8106* (2013.01)

(58) Field of Classification Search
USPC .......... 386/239–248, 200–201, 230
See application file for complete search history.

(56) References Cited

U.S. PATENT DOCUMENTS 9,182,801 B2* 11/2015 Lozovoy ............... H04M 1/22
2007/0078552 A1* 4/2007 Rosenberg ............ G06F 1/1626
700/94

(Continued)

Primary Examiner — Hung Dang
(74) Attorney, Agent, or Firm — Steven M. Greenberg, Esq.; CRGO Law

(57) ABSTRACT

Embodiments of the invention provide a method, system and computer program product for mobile device management during synchronized audio playback in coordination with external video playback. In an embodiment of the invention, a method for mobile device management during synchronized audio playback in coordination with external video playback includes receiving in memory of a mobile device a request to synchronize playback of an audio file through the mobile device with a presentation of video externally to the mobile device and in response to the request, automatically dimming a display of the mobile device and synchronizing playback of the audio file with the external presentation of the video.

9 Claims, 2 Drawing Sheets

(56) References Cited

U.S. PATENT DOCUMENTS

| | | | | |
|---|---|---|---|---|
| 2011/0102451 A1* | 5/2011 | Broga | ............ | G09G 3/3406 |
| | | | | 345/589 |
| 2012/0151236 A1* | 6/2012 | Vandeputte | ......... | G06F 1/3209 |
| | | | | 713/324 |
| 2014/0002375 A1* | 1/2014 | Rydenhag | ............ | G06F 3/041 |
| | | | | 345/173 |
| 2015/0074615 A1* | 3/2015 | Han | ............ | G06K 9/00033 |
| | | | | 715/863 |
| 2015/0319518 A1* | 11/2015 | Wilson | ............ | H04R 1/10 |
| | | | | 381/71.6 |

* cited by examiner

MOBILE DEVICE MANAGEMENT DURING SYNCHRONIZED AUDIO PLAYBACK IN COORDINATION WITH EXTERNAL VIDEO PLAYBACK

CROSS-REFERENCE TO RELATED APPLICATIONS

This application is a Continuation-in-Part of U.S. application Ser. No. 14/501,625, filed on Sep. 30, 2014, presently pending, the entire teachings of which are incorporated herein by reference.

BACKGROUND OF THE INVENTION

Field of the Invention

The present invention relates to audio playback in a mobile device and more particularly to audio playback in coordination with external video playback.

Description of the Related Art

Video playback refers to the presentation on a display substrate of previously recorded video imagery. Historically, video playback included merely the projection of a multiplicity of frames stored in a pancake of film onto screen—typically fabric. Audio playback simultaneously occurred with the playback of video imagery in a coordinated fashion based upon the transduction of optical patterns imprinted upon the film in association with one or more frames of imagery also imprinted upon the film. Thus, the coordination of playback of both audio and video remained the responsibility of a single projection device in the context of traditional film projection.

Unlike motion pictures, in the scholastic environment and even in the context of modern visual presentations, visual playback of a series of images such as a slide show occur separately from the playback of accompanying audio. In this regard, it is customary for the presenter to initiate playback, and in response to a particular cue, such as the presentation of a slide that states, "press play now", the presenter can manually initiate playback of an audio cassette to audibly supplement the presentation of a series of slides in the slide show. However, the necessity of precision in coordinating the playback of the audio cassette with the presentation of different slides is lacking in that each slide of the slide show may remain visible on a presentation screen for an extended duration.

Coordinating the playback of audio separately from the projection of a film in a movie theater is not a problem of present consideration because modern file projectors manage both audio and video playback. However, circumstances arise where external audio may be desired in supplement to or in replacement of the audio inherently present during the projection of a film. For example, for an audience member who comprehends a language other than the language of a presented film and other audience members, it is desirable to simulcast audio of a language native to the audience member in lieu of the audio of the presented film that differs from the language of the audience member. Yet, coordinating the synchronized playback of the supplemental audio with the playback of the video without the cooperation of the projectionist of the film can be a manually intensive process of timing the initiation of the playback of the supplemental audio in respect to a particular cue of the film.

Of note, the use of a mobile device to support synchronized audio playback within a theater environment is disfavored. In particular, recording devices are strictly prohibited by most if not all movie theaters so as to avoid the filming of a motion picture for subsequent unauthorized re-distribution to others. Yet, most mobile devices include audio and video recording functionality. Also, mobile devices such as a mobile telephone can generate a variety of audible and visual disturbances irritating to other theater-goers. Examples include the loud ringing of a cellular telephone, or the sounds produced by a mobile device upon receipt of a text message, e-mail message or voice mail. Other examples include the bright lights produced by the backlighting of a mobile phone which can disturb nearby customers. As such, utilizing a mobile phone to facilitate the playback of audio which is supplemental to the audio of a projected film in a theater environment can be problematic.

BRIEF SUMMARY OF THE INVENTION

Embodiments of the present invention address deficiencies of the art in respect to the use of a mobile device during audio playback synchronized with external video playback and provide a novel and non-obvious method, system and computer program product for mobile device management during synchronized audio playback in coordination with external video playback. In an embodiment of the invention, a method for mobile device management during synchronized audio playback in coordination with external video playback includes receiving in memory of a mobile device a request to synchronize playback of an audio file through the mobile device with a presentation of video externally to the mobile device and in response to the request, automatically dimming a display of the mobile device and synchronizing playback of the audio file with the external presentation of the video.

In one aspect of the embodiment, the method further includes automatically disabling audible notifications for messages, alarms and telephone calls in the mobile device. In another aspect of the embodiment, the method includes disabling in response to the request one or more user interface controls programmed to manage brightness of the display. In yet another aspect of the embodiment, the method further includes detecting a cessation of the playback of the audio file in the mobile device and in response to the cessation, brightening the display to a brightness level existing prior to the automatic dimming of the display. Finally, in even yet another aspect of the embodiment, the method further includes detecting ambient lighting through a camera of the mobile device and in response, brightening the display to a brightness level existing prior to the automatic dimming of the display.

In another embodiment of the invention, a data processing system is configured for mobile device management during synchronized audio playback in coordination with external video playback. The system includes a mobile computing device that has at least one processor, memory, cellular telephony circuitry and a display. The system also includes an audio synchronization module executing in the memory of the mobile computing device. The module includes program code enabled to respond to a request to synchronize playback of an audio file through the mobile device with a presentation of video externally to the mobile device by automatically dimming the display of the mobile device and synchronizing playback of the audio file with the external presentation of the video.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for mobile device management during synchronized audio playback in coordination with external video playback. In accordance with an embodiment of the invention, a request can be received in memory of a mobile device to synchronize playback of an audio track stored in the mobile device. In response to the request, a directive can be issued to the mobile device to dim backlighting of a display of the mobile device. Optionally, access to a manual adjustment of the backlighting of the display also can be disabled in response to the request. Thereafter, upon determining a cessation of the synchronized playback of the audio track in the mobile device, the backlighting of the display can be restored to a value previously in existence prior to the issuance of the dimming directive. Alternatively, a level of ambient lighting can be detected by a camera of the mobile device. In response to detecting a threshold degree of ambient lighting, the backlighting of the display can be restored to a value previously in existence prior to the issuance of the dimming directive.

Figure 1:
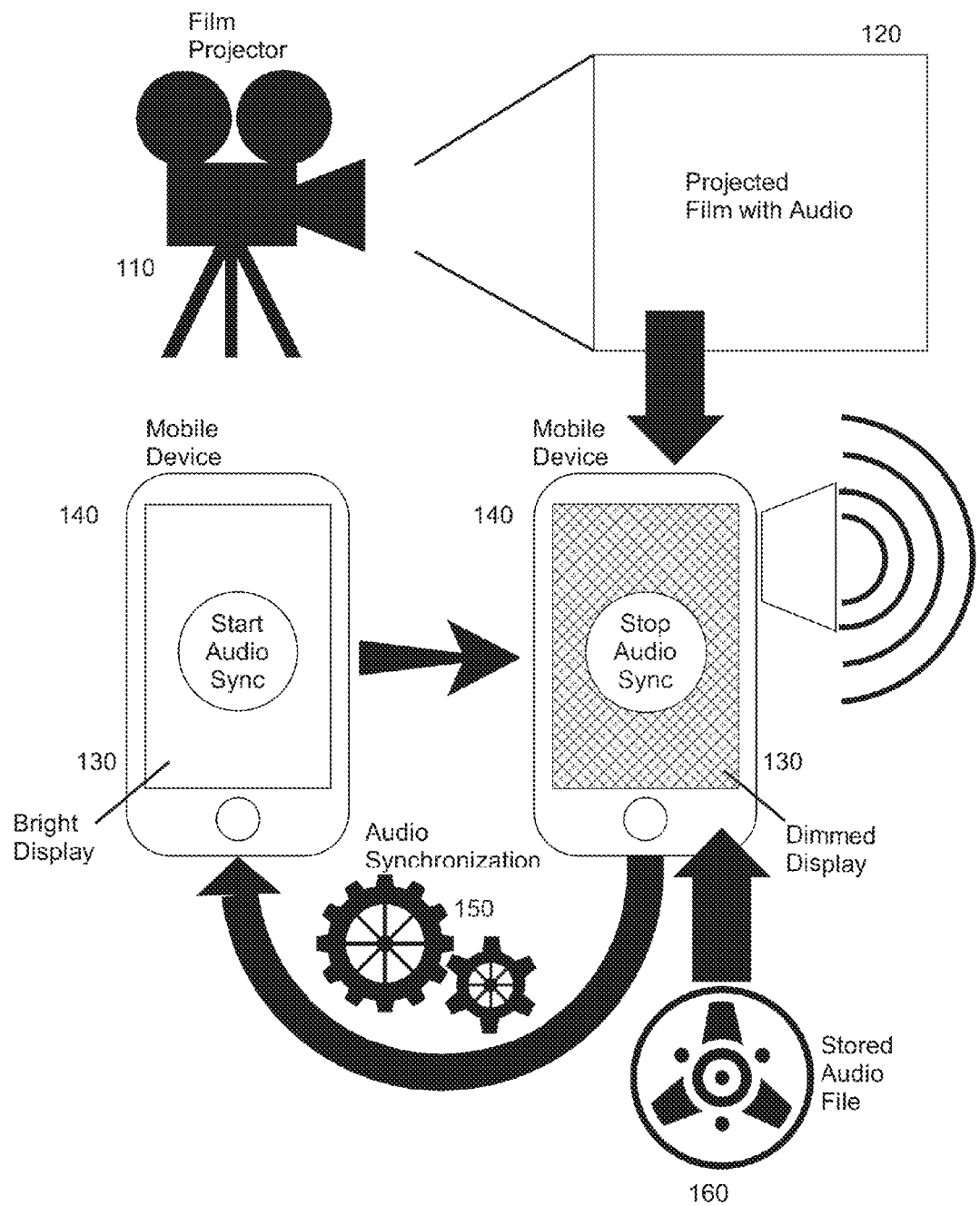
FIG. 1 is a pictorial illustration of a process for mobile device management during synchronized audio playback in coordination with external video playback.

In further illustration, FIG. 1 pictorially shows a process for mobile device management during synchronized audio playback in coordination with external video playback. As shown in FIG. 1, a film projector 110 can project a motion picture onto a screen 120 such as is the case in a movie theater. A mobile device 140 in proximity to the screen 120 can host the execution of audio synchronization logic 150. The synchronization logic 150 during execution can present a user interface in a display 130 of the mobile device 140 with a control in response to the activation of which, the audio synchronization logic 150 can direct the mobile device 140 to transduce the audio of the projected file for use by the audio synchronization logic 150 in synchronizing the playback of a stored audio file 160 through an audio output device of the mobile device 140. In this regard, the stored audio file can be substantially equivalent to the audio of the film projected onto the screen 120 excepting that the stored audio file 160 can be of a different language.

Of note, prior to the selection of the control in the user interface of the display 130 indicating a request to begin audio synchronization, the display 130 can provide backlighting sufficient to create a degree of brightness for viewers of the display 130. In response to the selection of the control in the user interface of the display 130, however, the audio synchronization logic 150 can direct the display 130 to dim the backlighting to a substantially reduced level. Further, the audio synchronization logic 150 can disable access to display controls of the mobile device 140 programmed to adjust the brightness of the display 130. Optionally, the audio synchronization logic 150 can respond to the selection of the control also by disabling audible notifications provided by the mobile device 140, for example, message notifications, alarm notifications and the ringer of the mobile device 140 typically activated upon receipt of an incoming phone call.

Figure 2:
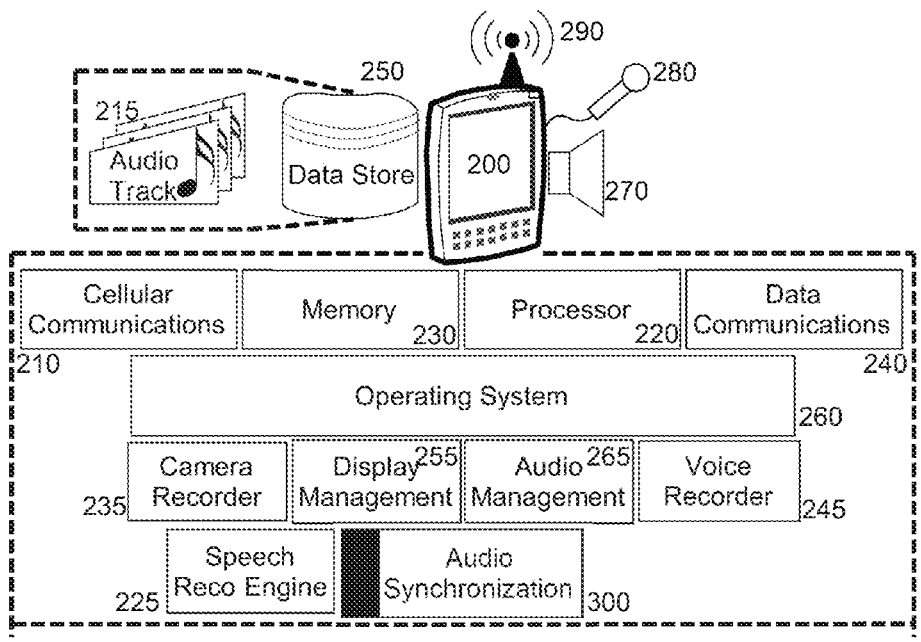
FIG. 2 is a schematic illustration of a data processing system configured for mobile device management during synchronized audio playback in coordination with external video playback; and, FIG. 3 is a flow chart illustrating a process for mobile device management during synchronized audio playback in coordination with external video playback.

The process described in connection with FIG. 1 can be implemented in a data processing system. In further illustration, FIG. 2 schematically shows a data processing system configured for mobile device management during synchronized audio playback in coordination with external video playback. The system can include a mobile device 200, for instance a smart phone, tablet computer or personal digital assistant. The mobile device 200 can include at least one processor 220 and memory 230. The mobile device 200 additionally can include cellular communications circuitry 210 arranged to support cellular communications in the mobile device 200, as well as data communications circuitry 240 arranged to support data communications.

An operating system 260 can execute in the memory 230 by the processor 220 of the mobile device 200 and can support the operation of a number of computer programs, including a camera recorder 235 and a voice recorder 245. Further, a display management program 255 can operate through the operating system 260 as can an audio management program 265. Of note, an audio synchronization module 300 can be hosted by the operating system 260. The audio synchronization module 300 can include program code that, when executed in the memory 230 by the operating system 260, can act to synchronize the playback through audio output circuitry 270 of a selected audio track 215 in data store 250 of the mobile device 200 in supplement to an externally projected motion picture.

In this regard, the program code of the audio synchronization module 300 is enabled to detect external audio provided by the projection of a motion picture through microphone 280. Speech recognition engine 225 also executing in the memory 230 by the operating system 260 can process the external audio to compare the resultant text to a known textual fingerprint so as to determine a position of the audio track to play back in synchronization with the detected external audio. Periodically, the program code of the audio synchronization module 300 can detect contemporaneously broadcast external audio provided by the projection of the motion picture. The detected audio again can be speech recognized by the speech recognition engine 225 so as to produce text for comparison with a known transcription of audio of the motion picture. Based upon the matching of the speech recognized text to text in the transcription, the program code of the audio synchronization module 300 is able to precisely locate a contemporaneous position of the detected external audio so as to coordinate the precise location in the audio track 215 to be played back through the audio output circuitry 270.

Importantly, the program code of the audio synchronization module 300 can be additionally enabled to respond to a request to synchronize the audio track 215 by directing the display management program 255 to dim the display of the mobile device 200. The program code of the audio synchronization module 300 additionally can be enabled to respond to a request to synchronize the audio track 215 by directing the display management program 255 to disable access to user interface controls of the display management program 255 to modify a brightness of the display. Even further, the program code of the audio synchronization module 300 additionally can be enabled to respond to a request to synchronize the audio track 215 by directing the audio management program 265 to disable audible notifications that otherwise would occur in the mobile device 200 in response to received messages, including e-mail, text and voice mail messages, received notifications from third party Web sites, and received notifications resulting from one or more alarms or timers.

Optionally, the program code of the audio synchronization module 300 can be enabled to detect a degree of ambient lighting through camera recorder 235. To the extent that the program code of the audio synchronization module 300 detects sufficient ambient lighting, the program code of the audio synchronization module 300 can direct the display management program 255 to restore backlighting of the display of the mobile device 200. Conversely, to the extent that the program code of the audio synchronization module 300 detects insufficient ambient lighting, the program code of the audio synchronization module 300 can direct the display management program 255 to dim the display of the mobile device 200. In either circumstance, in response to determining the termination of the audio synchronization, the program code of the audio synchronization module 300 can direct the display management program 255 to restore backlighting of the display of the mobile device 200 and any restrictions imposed by the display management program 255 and the audio management program 265 can be lifted.

Figure 3:
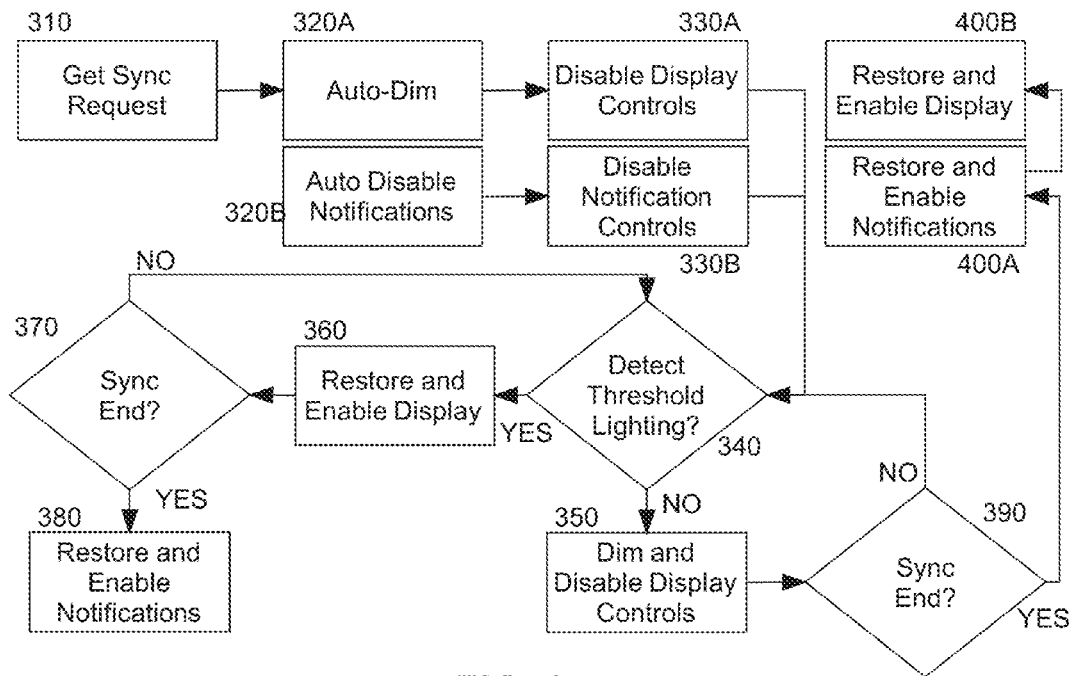

In even yet further illustration of the operation of the audio synchronization module 300, FIG. 3 is a flow chart illustrating a process for mobile device management during synchronized audio playback in coordination with external video playback. Beginning in block 310, a request for audio synchronization can be received. In block 320A, the display of the mobile device can be dimmed and in block 320B, audible notifications in the mobile device can be disabled. In block 330A, as an additional precaution, display controls necessary to adjust the brightness of the display of the mobile device can be disabled, as can user interface controls necessary to control audible notifications in the mobile device in block 330B.

In decision block 340, it can be determined if a threshold amount of ambient lighting is detected to indicate the presence of the mobile phone in a lighted room. If not, in block 350 the display can remain dimmed and the display controls can remain disabled. Thereafter, it can be determined if the audio synchronization has completed in decision block 390. If so, in block 400A audible notifications can be restored and the user interface controls necessary to control audible notifications re-enabled. Also, in block 400B, the backlighting of the display can be restored and the controls necessary to control the brightness of the display can be re-enabled.

However, if it is determined that a threshold amount of ambient lighting is detected to indicate the presence of the mobile phone in a lighted room, in block 360 the backlighting of the display can be restored as can the controls necessary to adjust the backlighting. Thereafter, in decision block 370 it can be determined if the synchronization of the audio has ended. If not, the process can return to decision block 340. Otherwise, in block 380 audible notifications can be restored and the user interface controls necessary to control audible notifications re-enabled.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for mobile device management during synchronized audio playback in coordination with external video playback, the method comprising:
   receiving in memory of a mobile device through the mobile device a request to synchronize playback of an audio file previously stored on the mobile device with a presentation of video externally to the mobile device;
   responding to the request to synchronize the playback of the audio file previously stored on the mobile device by automatically dimming a display of the mobile device and disabling one or more user interface controls programmed to manage brightness of the display and also synchronizing the playback of the audio file previously stored on the mobile device with the external presentation of the video; and,
   responding to a cessation of the playback of the audio file in the mobile device by brightening the display to a brightness level existing prior to the automatic dimming of the display and enabling the one or more user interface controls programmed to manage brightness of the display.

2. The method of claim 1, further comprising:
   automatically disabling audible notifications in the mobile device in response to the request.

3. The method of claim 1, further comprising:
   detecting ambient lighting through a camera of the mobile device; and,
   responsive to a detection of ambient lighting exceeding a threshold level, brightening the display to a brightness level existing prior to the automatic dimming of the display.

4. A data processing system configured for mobile device management during synchronized audio playback in coordination with external video playback, the system comprising:

a mobile computing device comprising at least one processor, memory, cellular telephony circuitry and a display; and, an audio synchronization module executing in the memory of the mobile computing device, the module comprising program code enabled to respond to a request received through the mobile device to synchronize playback of an audio file previously stored on the mobile device with a presentation of video externally to the mobile device by automatically dimming the display of the mobile device and disabling one or more user interface controls programmed to manage brightness of the display and also synchronizing the playback of the audio file previously stored on the mobile device with the external presentation of the video and subsequently responding to a cessation of the playback of the audio file in the mobile device by brightening the display to a brightness level existing prior to the automatic dimming of the display and enabling the one or more user interface controls programmed to manage brightness of the display.

5. The system of claim 4, wherein the program code is further enabled to automatically disable audible notifications in the mobile device in response to the request.

6. The system of claim 4, wherein the program code is further enabled to detect ambient lighting through a camera of the mobile device and to respond to a detection of ambient lighting exceeding a threshold level, by brightening the display to a brightness level existing prior to the automatic dimming of the display.

7. A computer program product for mobile device management during synchronized audio playback in coordination with external video playback, the computer program product comprising a non-transitory computer readable storage memory having program instructions embodied therewith, the program instructions executable by a device to cause the device to perform a method comprising:

receiving in memory of a mobile device through the mobile device a request to synchronize playback of an audio file previously stored on the mobile device with a presentation of video externally to the mobile device;

responding to the request to synchronize the playback of the audio file previously stored on the mobile device by automatically dimming a display of the mobile device and disabling one or more user interface controls programmed to manage brightness of the display and also synchronizing the playback of the audio file previously stored on the mobile device with the external presentation of the video; and, responding to a cessation of the playback of the audio file in the mobile device by brightening the display to a brightness level existing prior to the automatic dimming of the display and enabling the one or more user interface controls programmed to manage brightness of the display.

8. The program product of claim 7, wherein the method further comprises:

automatically disabling audible notifications in the mobile device in response to the request.

9. The program product of claim 7, wherein the method further comprises: detecting ambient lighting through a camera of the mobile device; and, responsive to a detection of ambient lighting exceeding a threshold level, brightening the display to a brightness level existing prior to the automatic dimming of the display.

\* \* \* \* \*